United States Patent
Horton et al.

(10) Patent No.: US 8,159,389 B2
(45) Date of Patent: Apr. 17, 2012

(54) MONITOR AND CONTROL OF RADIO FREQUENCY POWER LEVELS IN A GNSS SIGNAL DISTRIBUTION SYSTEM

(75) Inventors: Robert Ray Horton, Pueblo West, CO (US); Phillip Wayne Coiner, Pueblo, CO (US)

(73) Assignee: GPS Source, Pueblo, CO (US)

( * ) Notice: Subject to any disclaimer, the term of this patent is extended or adjusted under 35 U.S.C. 154(b) by 636 days.

(21) Appl. No.: 11/530,315

(22) Filed: Sep. 8, 2006

(65) Prior Publication Data

US 2007/0052584 A1 Mar. 8, 2007

Related U.S. Application Data

(60) Provisional application No. 60/714,857, filed on Sep. 8, 2005.

(51) Int. Cl.
*G01S 19/11* (2010.01)
(52) U.S. Cl. .................................. 342/357.48
(58) Field of Classification Search ........... 342/357.01–357.17, 357.2–357.78
See application file for complete search history.

(56) References Cited

U.S. PATENT DOCUMENTS

| | | | | |
|---|---|---|---|---|
| 5,708,679 A | * | 1/1998 | Fernandes et al. | 375/259 |
| 5,784,028 A | * | 7/1998 | Corman et al. | 342/357.48 |
| 5,952,958 A | * | 9/1999 | Speasl et al. | 342/357.395 |
| 6,040,798 A | * | 3/2000 | Kinal et al. | 342/357.01 |
| 6,201,497 B1 | * | 3/2001 | Snyder et al. | 342/357.46 |
| 6,639,541 B1 | * | 10/2003 | Quintana et al. | 342/18 |
| 7,019,687 B1 | * | 3/2006 | Schempp et al. | 342/357.02 |
| 7,310,064 B2 | * | 12/2007 | Cobb et al. | 342/386 |
| 2002/0050944 A1 | * | 5/2002 | Sheynblat et al. | 342/357.06 |

FOREIGN PATENT DOCUMENTS

WO 2004 081600 A 9/2004
WO 2004-081600 A 9/2004

OTHER PUBLICATIONS

International Search Report and Written Opinion dated Feb. 2, 2007 in Application No. PCT/US2006/035162.
International Preliminary Report on Patentability and Written Opinion mailed Mar. 20, 2008 in Application No. PCT/US2006/035162.

* cited by examiner

*Primary Examiner* — Thomas Tarcza
*Assistant Examiner* — Nga X Nguyen
(74) *Attorney, Agent, or Firm* — Banner & Witcoff, Ltd.

(57) ABSTRACT

A system and method is provided for monitoring and possibly controlling radio frequency power levels within GNSS signal distribution networks. With respect to GNSS signal distribution networks that re-radiate the GNSS signal, limiting GNSS signals to an intended area is described.

26 Claims, 11 Drawing Sheets

Figure 10A — Signal control algorithm: Average All Available SV SNRs

Figure 10B — Signal control algorithm: Average SV SNRs within SNR Mask

Figure 10C — Signal control algorithm: Average SV SNRs within Elevation Mask

Figure 12

MONITOR AND CONTROL OF RADIO FREQUENCY POWER LEVELS IN A GNSS SIGNAL DISTRIBUTION SYSTEM

RELATED APPLICATION INFORMATION

This application claims priority to U.S. Ser. No. 60/714,857, filed Sep. 8, 2005, whose contents are expressly incorporated herein by reference.

TECHNICAL FIELD

Aspects of the invention generally relate to global navigation satellite systems. More specifically, aspects of the present invention relate to enhancing the operation of GNSS satellite signal distribution networks.

RELATED ART

Global Navigation Satellite System (GNSS) is a term used generally to describe radio navigation satellite systems that orbit the earth and emit reference signals that enable certain types of radio navigation receivers to determine their location on or near the surface of the earth. For example, the Global Positioning System (GPS) is a GNSS currently in use by the United States. In addition to the GPS system, there are other similar GNSS systems that currently perform or, in the future, will perform similar functions. These systems include the European Union's Galileo system, the Russian Federation's GLONASS system, and the Japanese Quasi-Zenith Satellite System (QZSS).

GNSSs emit radio frequency (RF) signals that, when received and processed, can provide location and navigation services to, for instance, individual persons for recreational uses, to commercial entities for use in "for profit" activities, to government and military entities for navigation of weapon systems, and to public safety organizations to assist in directing emergency personnel. In one example, many modern vehicle manufacturers incorporate GPS navigation systems in commercial vehicles to guide drivers in unfamiliar areas. Similarly, GPS type devices have also been adapted to cell phone technology so that rescue personnel are able to locate a missing or lost individual in emergency situations.

GNSS satellite systems typically operate at mid-earth orbits (approximately 10,900 nautical miles high) and at Geo-synchronous orbits (approximately 19,300 nautical miles high). Due to the altitude of these satellite systems, the signals are very weak when they reach the surface of the earth. In order to enable the design of small antennas with high gain, frequencies for GNSS satellite transmission are typically chosen in the L bands (approximately 1 GHz to 2 GHz). The disadvantage of this frequency choice is that systems operating at this frequency generally operate by line of sight. That is, L band frequencies exhibit poor signal penetration into dense building materials or earth. Thus, there are many locations, such as large manufacturing facilities, aircraft maintenance facilities, fire and EMS garages, etc. where it is desirable for GNSS receivers to operate but where the GNSS satellite signals are typically not available. Such lack of availability of GNSS satellite signals can preclude testing and maintenance of GPS enabled systems (e.g. GPS product manufacturing facilities or aircraft maintenance facilities) or, in the case of Fire and EMS vehicles, can result in mission critical GPS receivers growing "cold", which in turn can result in lost response time as the vehicle waits for GPS receivers re-acquire upon departing the garage. These limitations are routinely addressed by way of a GNSS signal distribution network in the facility which provides for enhanced indoor GNSS signal coverage, enabling these GNSS applications to operate in locations where the GNSS signals would not otherwise be available.

Indoor GNSS signal distribution networks may be realized by a GNSS receive antenna and a coaxial cable distribution network, possibly including amplification stages and signal dividers. Indoor GNSS signal distribution networks may also be realized by a GNSS receive antenna, a coaxial cable distribution network, which may or may not including amplification stages and signal divider networks, and a GNSS transmitter device that re-radiates the GNSS signal. Further, another GNNS signal distribution network may include a wireless network and other transmission networks. In order to ensure proper performance of GNSS receivers operating in conjunction with GNSS signal distribution networks, it is desirable that the GNSS signal distribution network monitors and controls the radio frequency power levels within the GNSS signal distribution system, or in the case of GNSS signal distribution systems that re-radiate GNSS signals, limit coverage to the intended area.

SUMMARY

Aspects of the present invention address one or more of the issues mentioned above, thereby providing for controlled and monitored radio frequency power levels within GNSS signal distribution networks. With respect to GNSS signal distribution networks that re-radiate the GNSS signal, some aspects of the invention relate to limiting coverage to an intended area. At least one aspect of the present invention provides a monitor of the radio frequency power levels within the GNSS signal distribution system to ensure that the GNSS radio frequency power levels are known to the operators of the GNSS receivers that are operating in conjunction with the GNSS signal distribution system. Another aspect of the present invention provides a monitor and control of the radio frequency power levels within the GNSS signal distribution system to ensure that the GNSS radio frequency power levels within the GNSS signal distribution system are within the range of signal levels that may be processed by the GNSS receivers operating in conjunction with the GNSS signal distribution system. Still another aspect of the present invention provides for a system and method to adjust and set the monitored and controlled GNSS radio frequency power levels within the GNSS signal distribution system. One or more aspects of the present invention described above or below can enhance the operational capabilities of GNSS signal distribution networks, giving operators of such networks confidence in the GNSS radio frequency power levels available from or within the GNSS signal distribution network.

These and other aspects of the invention are addressed in relation to the Figures and related description.

BRIEF DESCRIPTION OF THE DRAWINGS

The foregoing summary of the invention, as well as the following detailed description of the preferred embodiments, is better understood when read in conjunction with the accompanying drawings, which are included by way of example, and not by way of limitation with regard to the claimed invention.

DETAILED DESCRIPTION

Aspects of the present invention will now be described with reference to the accompanying drawings, in which various aspects of the invention are shown. Aspects of the invention may, however, be embodied in different forms and should not be construed as limited to the illustrative examples set forth herein. Rather, the examples are provided so that this disclosure will be thorough and complete, and will fully convey the scope of the invention to those skilled in the art. The elements and drawings are not necessarily to scale, emphasis instead being placed upon clearly illustrating the principals of the present invention.

It is noted that various connections are set forth between elements in the following description. It is noted that these connections in general and, unless specified otherwise, may be direct or indirect and that this specification is not intended to be limiting in this respect.

Figure 1:
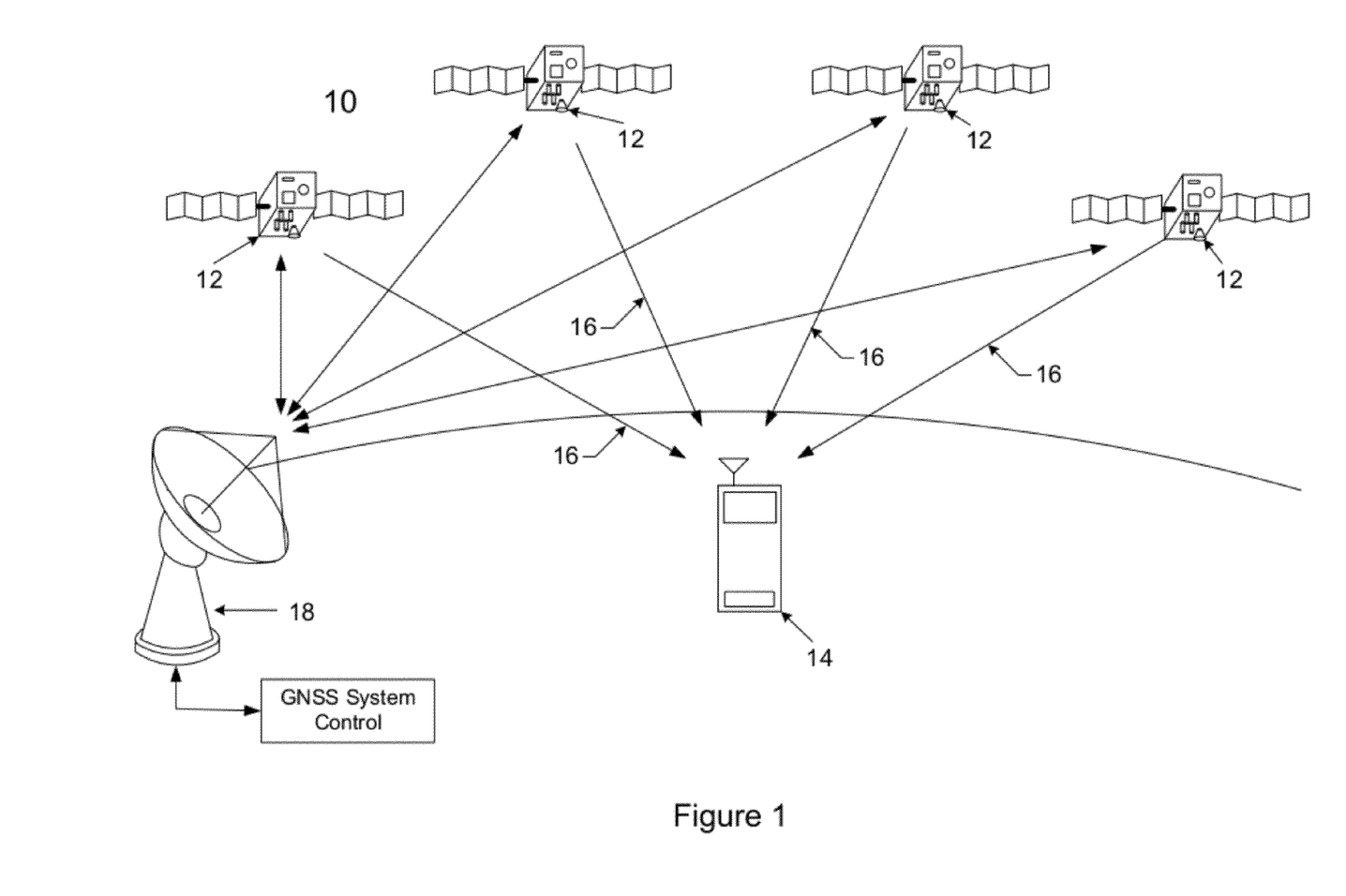
FIG. 1 illustrates a Global Navigation Satellite System (GNSS) that may support one or more aspects of the present invention.

FIG. 1 illustrates a Global Navigation Satellite System (GNSS) 10 that may support one or more aspects of the present invention. GNSS systems are space-based triangulation systems that include multiple radio navigation satellites 12 and at least one a ground control segment 18.

As the GNSS satellites 12 orbit the earth, they emit radio navigation signals 16 synchronously according to GNSS system time. The signals 16 possess certain spread spectrum properties that allow the receiver 14 to measure the signal's time of arrival at the receiver's location. In addition to the spread spectrum properties, the signals 16 also contain a digital data steam, referred to as navigation data, that includes parameters describing the GNSS constellation orbital patterns as well as the GNSS system time. With the orbital parameters and system time, the GNSS receiver 14 can calculate the location of a satellite 12 in space at the moment the spread spectrum signal 16 was broadcast from the satellite 12. With knowledge of the satellite's position and system time when the signal 16 was broadcast, the receiver 14 can use this information along with the signal's time of arrival to determine the time of flight of the signal 16. Multiplying by the speed of light and adjusting for certain atmospheric propagation effects, the receiver 14 can determine the range to the satellite 12. Once this process has been completed for three or more satellites 12, the receiver 14 can use a triangulation technique to calculate its location on or near the surface of the earth.

The spread spectrum signals used by GNSS satellites 12 may be created by multiplying the carrier signals with binary codes, referred to as "chipping codes," which may be of a predetermined frequency and length, and which may also possess unique mathematical properties. These chipping codes may be such that, if one code of the family of codes is time correlated with another code of the same family, the result will be zero correlation. Furthermore, a chipping code time correlated with a shifted version of the same code may also result in zero correlation so long as the code is shifted by more than +/- one chip. The time correlator output in the GNSS receiver 14 may only produce a non-zero result, i.e. a correlation peak, when a code is correlated with a copy of the same code and at the exact moment that the two copies are aligned. Such a method allows a GNSS receiver 14 to measure the time that a satellite signal 16 is received. Since the codes may be repeated continuously in the satellite signal 16, it can be said that the receiver 14 is measuring the code phase of the signal 16 when it arrives at the receiver's location.

One additional unique property of the spread spectrum signals 16 used by GNSS satellites 12 is that the chipping codes may be such that if one code of the family of codes is time correlated with random noise from the signal environment or the receiver 14 circuitry, the result will also be a near zero correlation. Furthermore, a chipping code time correlated with an aligned version of the same code (within +/− one chip) in the presence of noise from the signal environment or the receiver circuitry may result in strong non-zero correlation, having the effect of significantly reducing the error contribution of the noise, depending on the overall length of the chipping code. Longer chipping codes enable the ability of GNSS receivers to process GNSS signals that are many orders of magnitude below the random noise levels that may be present in a GNSS system.

Figure 2:
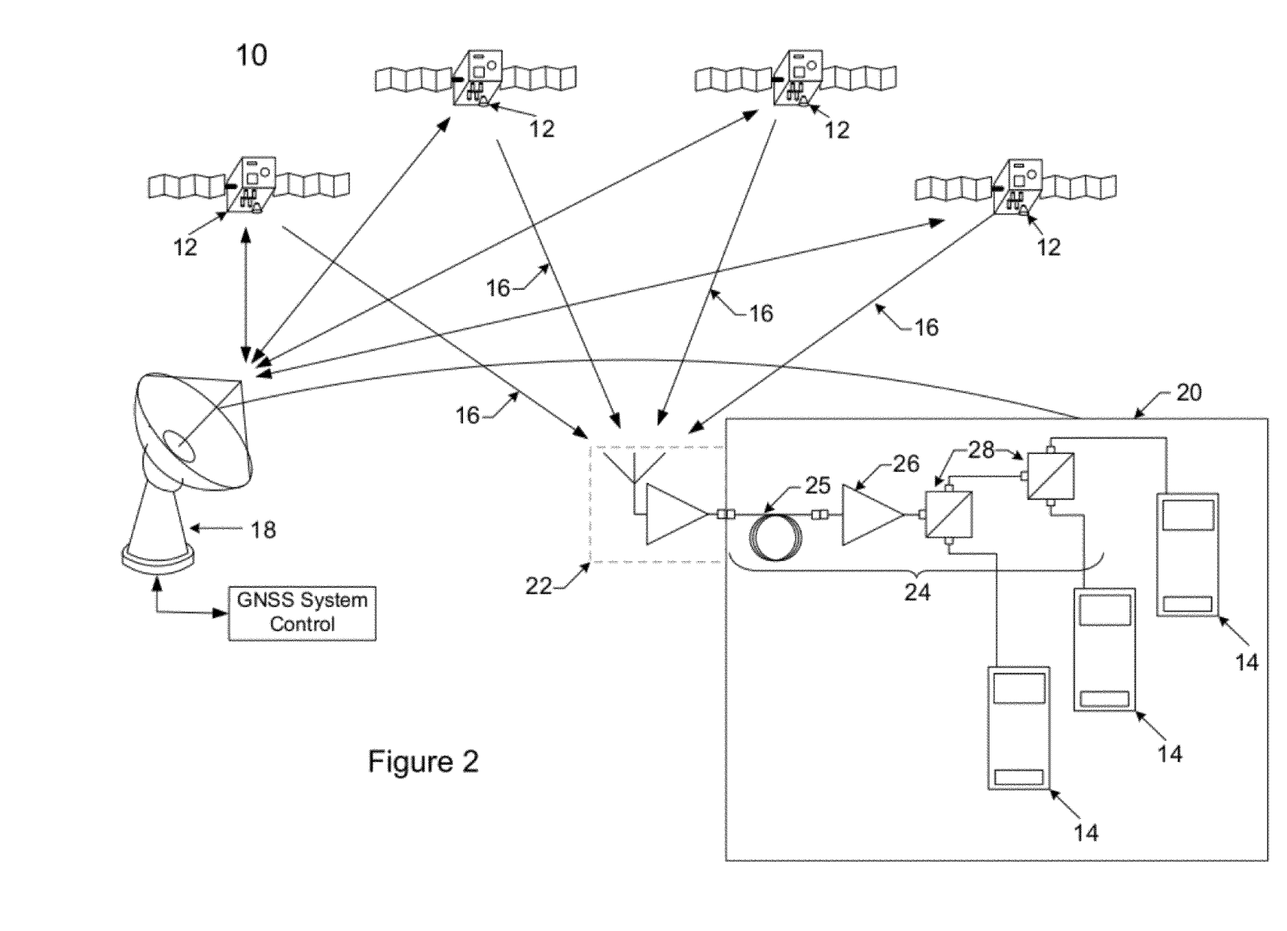
FIG. 2 illustrates a GNSS system operating in conjunction with an illustrative coaxial cable example of a GNSS signal distribution network and one or more GNSS receivers in accordance with one or more aspects of the present invention.
Figure 3:
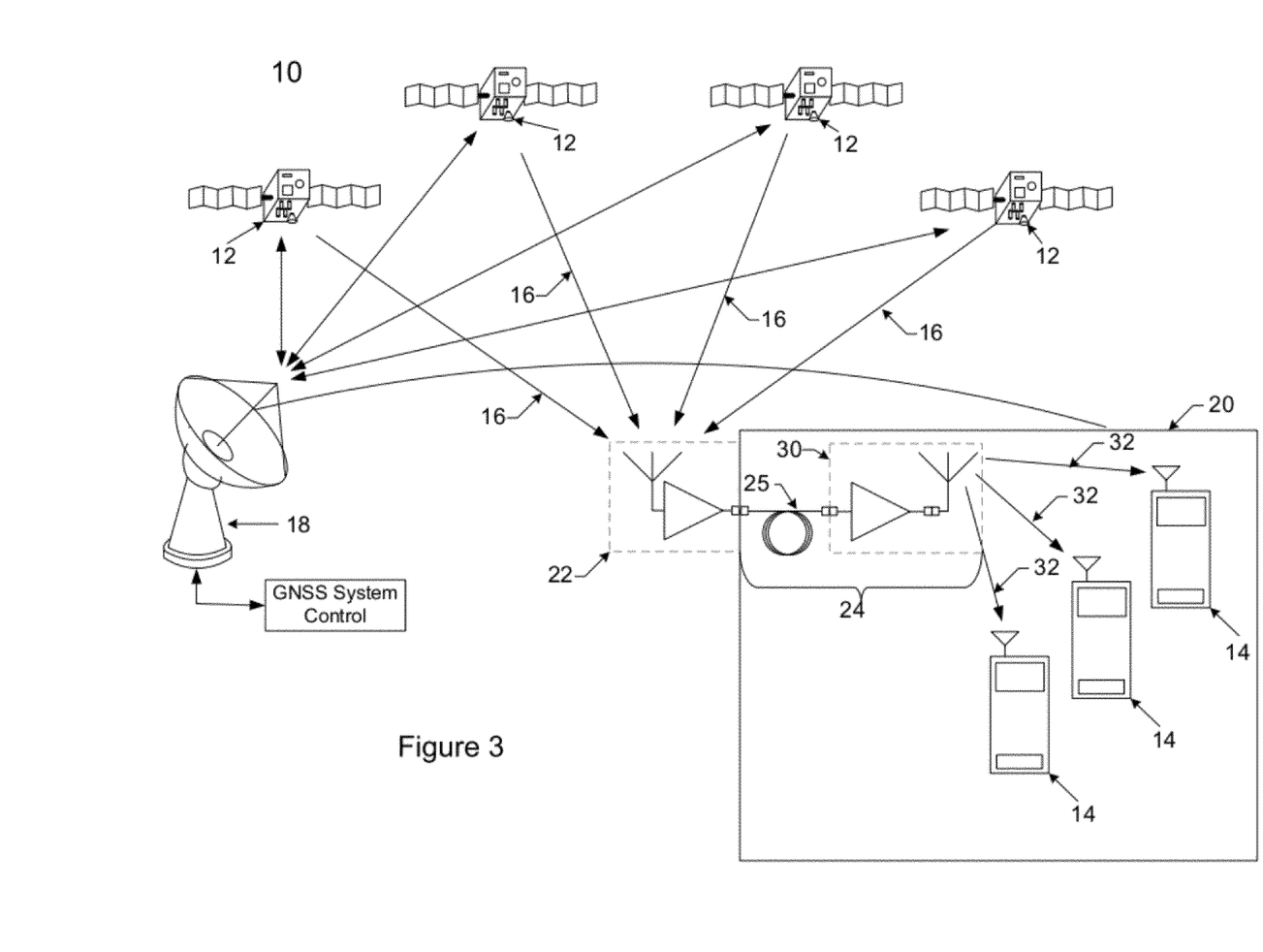
FIG. 3 illustrates a GNSS system operating in conjunction with an illustrative GNSS re-radiator example of a GNSS signal distribution network and one or more GNSS receivers in accordance with one or more aspects of the present invention.

FIGS. 2 and 3 illustrate a GNSS system 10 operating in conjunction with either a coaxial cable example, FIG. 2, or a re-radiator example, FIG. 3, of a GNSS signal distribution network 24 and one or more GNSS receivers 14, allowing the GNSS receivers 14 to operate inside of a structure or obstacle 20 where the GNSS signals would otherwise be unavailable. In these configurations, the radio navigation signals 16 from the radio navigation satellites 12 are collected by the GNSS signal distribution network receive antenna 22. In the case of the coaxial cable example, FIG. 2, the radio navigation signals 16 are distributed throughout the network 24 to the GNSS receivers 14 by way of coaxial cables 25, wherein the network 24 may or may not including amplification stages 26 and signal divider networks 28. In the case of the re-radiator example as shown in FIG. 3, the radio navigation signals 16 are distributed to the GNSS receivers 14 by way of coaxial cables 25 and a GNSS transmitter device 30 that re-radiates the combined GNSS signals 32. The GNSS re-radiator example of a GNSS signal distribution system may or may not include amplification stages 26 and signal divider networks 28. In either case, the GNSS receivers 14 eventually receive the radio navigation signals 16 (or signals containing similar information), enabling the receivers to process the signals and to operate in spite of the obstruction 20, enabling possible testing and/or maintenance of GNSS enabled systems (e.g., GPS product manufacturing facilities or aircraft maintenance facilities) or, in the case of Fire and EMS vehicles, preventing mission critical GNSS receivers from growing "cold", which in turn can result in zero re-acquisition delay as the vehicle departs a garage (or tunnel, underpass, and the like), saving valuable response time.

While FIGS. 2 and 3 describe coaxial and re-radiation systems to transfer or distribute GNSS signals, other distribution or transmission pathways are included within the scope of the invention including but not limited to fiber optic transmission pathways (including light emitters and receivers) and frequency shifting transmission pathways (including frequency shifters to raise or lower the frequencies of the GNSS signals so subsequent transmission of the data of the GNSS signals does not interfere with other GNSS receivers), and the like. For instance, one may shift the GNSS signals to unregulated frequencies such as the 2.4 GHz frequency band.

Figure 4:
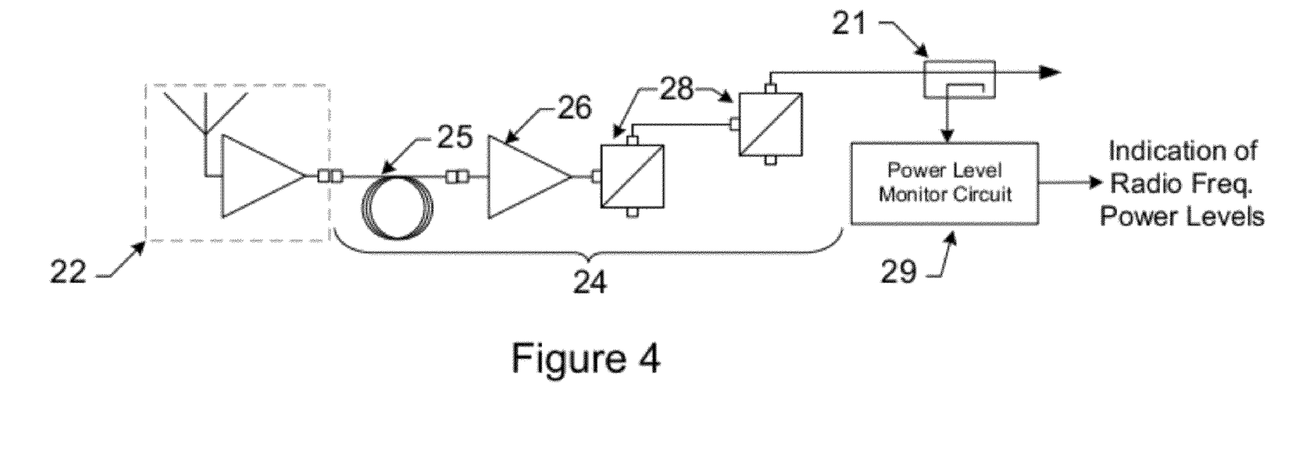
FIG. 4 illustrates an illustrative coaxial cable example of a GNSS signal distribution network including a system for monitoring of the radio frequency power levels within the GNSS signal distribution system in accordance with one or more aspects of the present invention.
Figure 5:
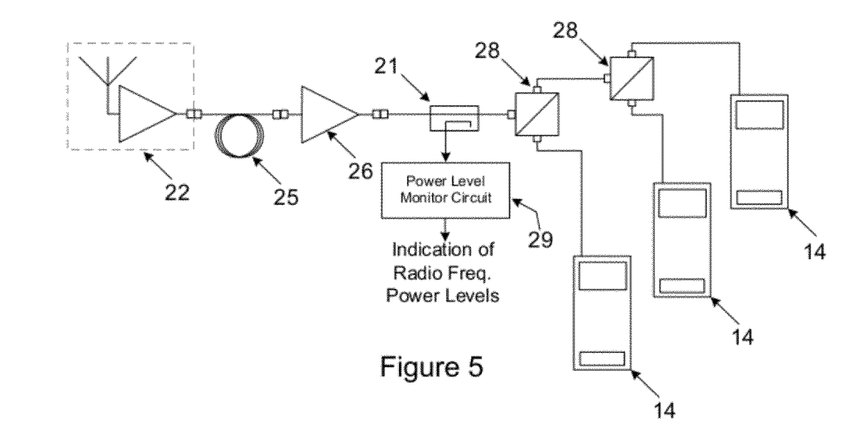
FIG. 5 illustrates an illustrative coaxial cable example of a GNSS signal distribution network including a system for monitoring of the radio frequency power levels within the GNSS signal distribution system according to one or more illustrative embodiments of the present invention in accordance with one or more aspects of the present invention.
Figure 6:
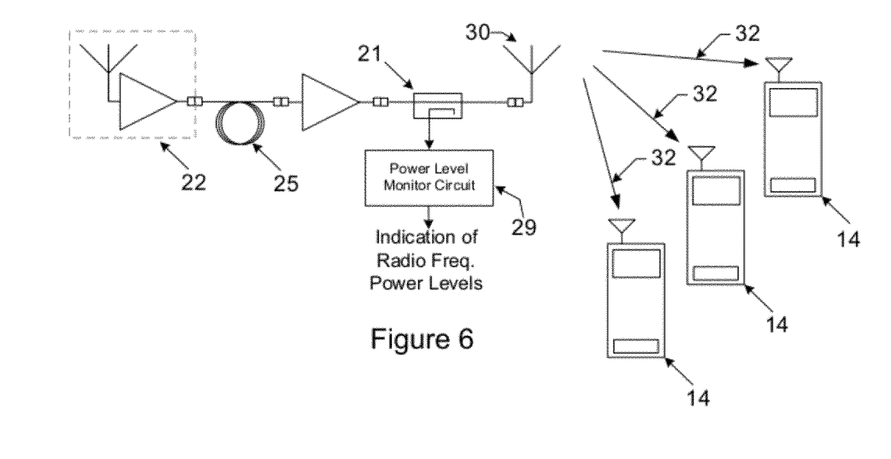
FIG. 6 illustrates an illustrative GNSS re-radiator example of a GNSS signal distribution network including a system for monitoring of the radio frequency power levels within the GNSS signal distribution system according to one or more illustrative embodiments of the present invention in accordance with one or more aspects of the present invention.

In the course of operating GNSS receivers in conjunction with GNSS signal distribution networks, due to the limited input signal dynamic range of most GNSS receivers, it is desirable for the GNSS signal distribution network operator to have knowledge of the GNSS radio frequency signal levels available within the network. Furthermore, in GNSS signal distribution systems that re-radiate the GNSS signal, it is desirable for the operator to limit coverage to the intended area. Thus, in one example, it is generally desirable that GNSS signal distribution networks have the capability to monitor and report the GNSS radio frequency signal levels so as to determine if GNSS receivers will operate properly with the network and to ensure that coverage is limited to the intended area. With reference to FIG. 4, and by way of example, a GNSS signal distribution network with a system for monitoring and reporting of GNSS radio frequency signal levels is shown. This realization of a GNSS signal distribution network includes a GNSS receive antenna 22, which may include amplification, a coaxial cable signal distribution network 24 (which may include coaxial cables 25, amplifiers 26, and/or power dividers 28), a radio frequency coupler device 21, and a GNSS radio frequency power monitor circuit 29. In this example, the signals present in the GNSS signal distribution system may be sampled by a sampling device (which may include the radio frequency power coupler 21, a capacitor, a signal divider, and the like) and applied to the GNSS radio frequency power monitor circuit 29. The GNSS radio frequency power monitor circuit 29, exploiting knowledge of the characteristics of the GNSS radio frequency signals, determines the signal levels present in the GNSS signal distribution network and provides and indication of the signal levels to the network operator. FIGS. 5 and 6 illustrate by way of example a coaxial cable example, FIG. 5, of a GNSS signal distribution network with a system for monitoring GNSS radio frequency signal levels and a GNSS re-radiator example, FIG. 6, of a GNSS signal distribution network with a system for monitoring GNSS radio frequency signal levels. In both examples, the system for monitoring GNSS radio frequency signal levels is placed in the common radio frequency signal path so as to measure the levels of the GNSS radio frequency signal levels.

Figure 7:
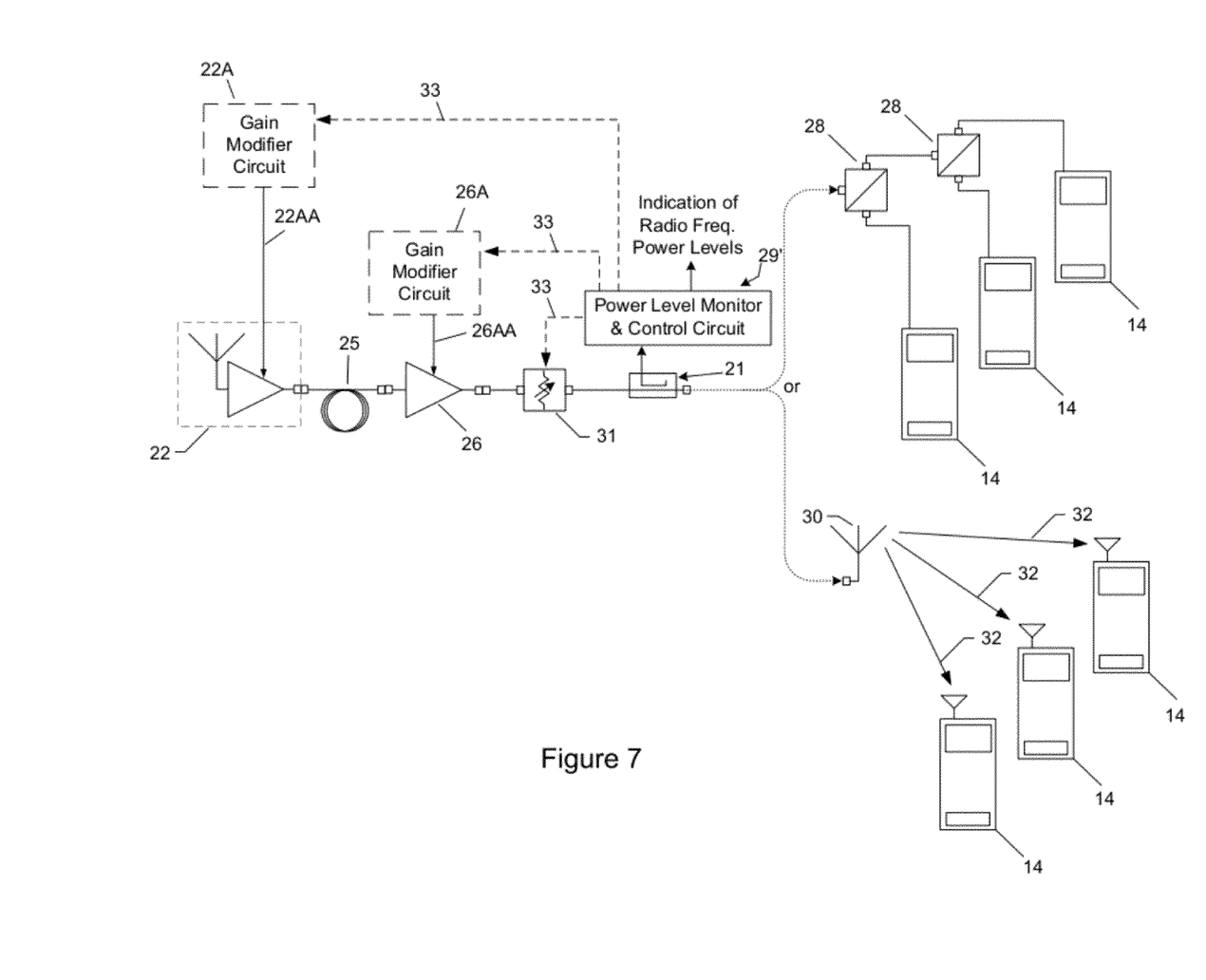
FIG. 7 illustrates the GNSS signal distribution network of either a coaxial cable example or a re-radiator example, further illustrating a system for monitoring and controlling the radio frequency power levels within the GNSS signal distribution network in accordance with one or more aspects of the present invention.

With reference to FIG. 7, the example of the system for monitoring the GNSS radio frequency signal levels further includes a system to control the GNSS radio frequency signal levels, enabling the GNSS signal distribution network operators to monitor and control the GNSS radio frequency signal levels within the network at a level that is compatible with GNSS receivers 14 operating in conjunction with the network and, in the case of the GNSS signal distribution network that re-radiates the GNSS signals 30, limiting coverage to the intended area. In this embodiment, the system to control the GNSS radio frequency signal levels within the signal distribution network is realized by a control signal 33 from the GNSS signal level monitor and control circuit 29'. The control signal 33 may be used to adjust the GNSS radio frequency signal levels within the GNSS signal distribution network by adjusting the amplification pathway gain 22 and 26 or attenuation 31. In one example, the control signal 33 may be used to adjust the GNSS radio frequency signal levels by adjusting a variable attenuator 31, which is placed in the common radio frequency signal path so as to alter the levels of the GNSS radio frequency signal levels in the network.

Alternatively, the amplification pathway may be modified by at least one of gain modifier circuitry 22a and 26a that adjust the gain levels of amplifier 22 and/or 26. The circuitry 22a and/or 26a may receive control signal 33 from circuit 29 and short the gain from their respective amplifier to 0 (via a short circuit for example). Furthermore, circuitry 22a and/or 26a may alternatively or additionally have a gain control ability (represented by connection 22aa and 26aa respectively) that modifies the gain of the amplifier 22 or 26. The modified gain may be any range so as to achieve the desired GNSS radio frequency signal levels within the distribution network. The gain modifier circuitry 22a and 26a may operate alone or together to adjust the amplification of two or more amps. Furthermore, the gain modifier circuitry 22a and 26a may operate alone or together in conjunction with a variable attenuator 33 to achieve the desired GNSS radio frequency signal levels within the distribution network. The modification of the gain of amplifiers and signal attenuators is known to those of ordinary skill in the art and may include, for instance, changing the bias via voltage control, current control, or signal level (binary or otherwise) and the like.

As described previously, due to the unique properties of GNSS signals 16, GNSS receivers 14 may have the ability to receive and process the GNSS signals when those signals are significantly below the random noise that may exist in the GNSS signal environment or in the GNSS receiver circuitry. Such operation is frequently the case for many modern GNSS system implementations, wherein the GNSS signals are routinely at levels below the random noise levels in the GNSS signal environment or in the GNSS receiver circuitry. As such, evaluation of the GNSS radio frequency signal levels for GNSS systems that operate with signals that are below the random noise levels require a specific measurement apparatus that is aware of the unique spread spectrum properties of the signals it is trying to measure. Since GNSS receivers 14 must possess the knowledge of the spread spectrum properties of the signals it is attempting to receive, GNSS receivers may be used to evaluate the radio frequency signal levels that exist in a GNSS signal distribution system. In this regard, GNSS receivers 14 may then include conventional GNSS receivers and GNSS correlators and the like. Furthermore, GNSS receivers may possess a capability to report a figure of merit that describes the quality of the received GNSS signals, which figure of merit may be a report of the Signal-to-Noise Ratio (SNR). Other figures of merit may include actual SNR ratios or power level. For the purposes of explanation here, SNRs are used. However, it is readily appreciated that actual SNR ratios or power levels or other figures of merit may be reported by the GNSS receivers and used by downstream circuitry for various monitoring and control functions.

This signal-to-noise ratio (an example of the figure of merit) which may be reported from GNSS receivers may posses certain characteristics wherein the relationship between the received GNSS radio frequency signal level and the reported signal-to-noise ratio may be a linear relationship with a slope of unity. In such GNSS systems, it is therefore possible to utilize the SNR levels reported from a GNSS receiver to determine the actual GNSS radio frequency signal levels available to the receiver.

Figure 8:
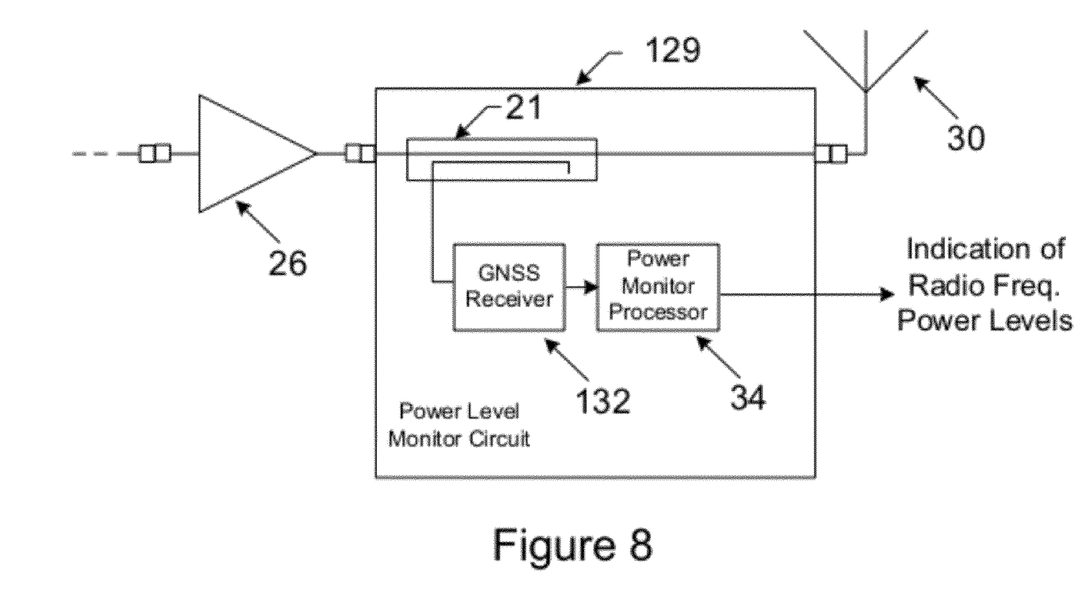
FIG. 8 illustrates an illustrative example of a system for monitor of GNSS radio frequency signal power levels in the GNSS signal distribution network in accordance with one or more aspects of the present invention.

With reference to FIG. 8, a potential system for monitoring and reporting the GNSS radio frequency signal levels in a GNSS signal distribution network is described. In this aspect of the present invention, a circuit 129 for measuring or monitoring the radio frequency power levels within the GNSS signal distribution system may include a circuit 21 for sampling the radio frequency signal levels and a GNSS receiver 132. The circuit 21 for sampling the radio frequency signal levels may include a Radio Frequency (RF) power coupler 21, or a −3 dB power divider, or simply a capacitor. In the example shown, at least some of the signals present in the GNSS signal distribution system may be sampled by a RF power coupler 21. These signals are then applied to the input of the GNSS receiver 132. The GNSS receiver 132 processes these signals and, if the signals are within the dynamic range of the receiver 132, the receiver 132 will output signal-to-noise ratio levels to the power monitor processor 34 for each GNSS satellite vehicle signal that is present in the GNSS signal distribution network. The power monitor processor 34 will then calculate the actual radio frequency GNSS signal levels for each GNSS satellite vehicle signal present based on the linear relationship described earlier between the reported signal-to-noise ratios and the GNSS radio frequency signal level.

Figure 9A:
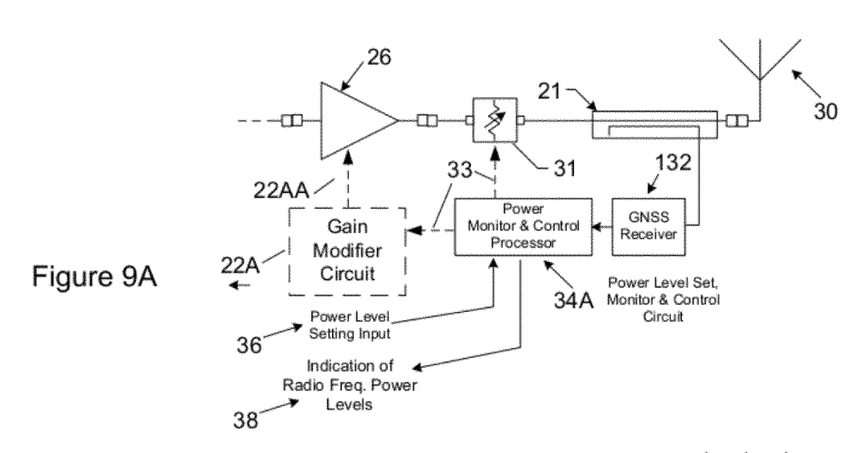
FIG. 9A illustrates an illustrative example of a system for setting, monitor and control of GNSS radio frequency signal power levels in the GNSS signal distribution network in accordance with one or more aspects of the present invention.

FIG. 9A illustrates a similar example of a system for monitoring and reporting the GNSS radio frequency signal levels in a GNSS signal distribution network, further incorporating a system for controlling the GNSS radio frequency signal levels within the GNSS signal distribution network, wherein the power monitor and control 34A, based on SNRs reported from the GNSS receiver 132, calculates GNSS signals levels present in the distribution network, and determines the appropriate settings for the amplifier 26, or the attenuator 31, or both, to achieve the specified power levels as defined by the power level setting input 36. The power monitor and control processor 34A then generates the appropriate control signals 31 that will result in the specified power levels as defined by the power level setting input 36.

It is appreciated that the power monitor and control processor 34A can work with the output of receiver 132 based on the output figure of merit. For instance, if the output figure of merit from receiver 132 is an actual power level, the power monitor and control processor 34A may use the actual power level value.

For the purposes herein, the power monitor and control processor 34A combines a monitoring function and control function in the single element. It is appreciated that these functions may be split into two or more separate circuits. Reference to the power monitor and control processor 34A is intended to encompass both a single processor or multiple processors unless specifically indicated otherwise.

FIG. 9A also shows optional attenuator 31 being controlled by control signal 33 and optional gain modifier circuit 22A. Further, power monitor and control processor 34A may also output an indication of radio frequency power levels relating to the signals it is monitoring.

It is appreciated that the output signal 33 may be an actual value to which attenuator 31 and/or gain modifier circuit 22A may be set. Alternatively, the output signal 33 may be another type of signal, for instance, a signal that merely indicates whether to increase or decrease the gain of the entire or part of the GNSS signal distribution network. Further, other types of values or analysis may be output as output signal 33.

Figure 9B:
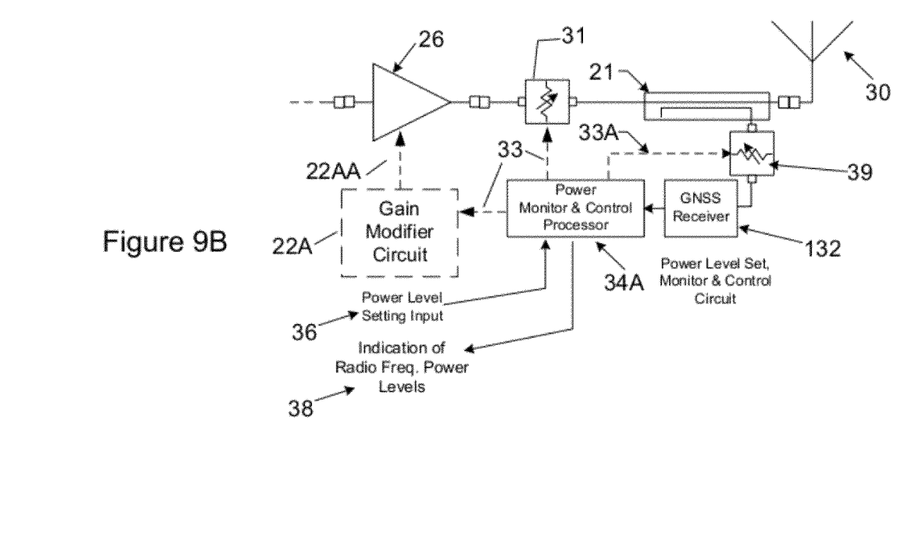
FIG. 9B illustrates an illustrative example of a system for setting, monitor and control of GNSS radio frequency signal power levels in the GNSS signal distribution network, further illustrating a system for maintaining the GNSS radio frequency signal levels to the GNSS receiver within the dynamic operating range of the GNSS receiver in accordance with one or more aspects of the present invention.

With reference to FIG. 9B, a further improvement on the system for monitoring and reporting the GNSS radio frequency signal levels in a GNSS signal distribution network includes an additional device for controlling the level of the sampled GNSS radio frequency signals applied to the GNSS receiver 132. By further controlling the signal levels to the GNSS receiver device, the range of the signals that may be monitored and controlled within the GNSS signal distribution network are increased beyond the dynamic range of the GNSS receiver 132. In this example, the additional device for controlling the level of the sampled GNSS radio frequency signals applied to the GNSS receiver 132 is a variable attenuator 39 as controlled by control signal 33A from power monitor and control processor 34A. Control signal 33A may instruct attenuator 39 to decrease the level of the signals received by GNSS receiver 132 so that the GNSS receiver 132 may properly handle received signals.

In the preceding examples of various embodiments of the invention, it was described that the GNSS receiver 132 reports signal-to-noise ratio levels to the power monitor and control processor 34A, wherein the power monitor and control processor 34A calculates the GNSS signals levels present in the distribution network, and determines the appropriate settings for the signal level control devices, the amplifier 26 or the attenuator 31, to achieve the specified power levels as defined by the power level setting input 36. Depending on the specified levels of the GNSS signals in the distribution network, the power monitor and control processor 34A determines the appropriate setting for the GNSS receiver input level control device 39 to ensure that the sampled signals are within the dynamic range of the receiver 132 and provides this setting via signal 33A. Processes for how the power monitor and control processor 34A performs these functions will now be described.

Figure 10A:
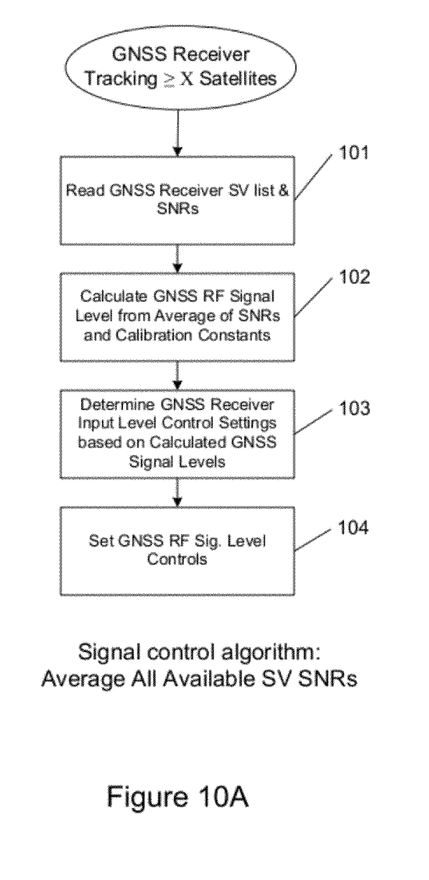
FIG. 10A illustrates an illustrative example for an algorithm for calculating and controlling the GNSS radio frequency signal levels within the GNSS signal distribution network based on all of the Satellite Vehicle Signal-To-Noise Ratios (SNRs) reported by the GNSS receiver in accordance with one or more aspects of the present invention.
Figures 10B, 10C:
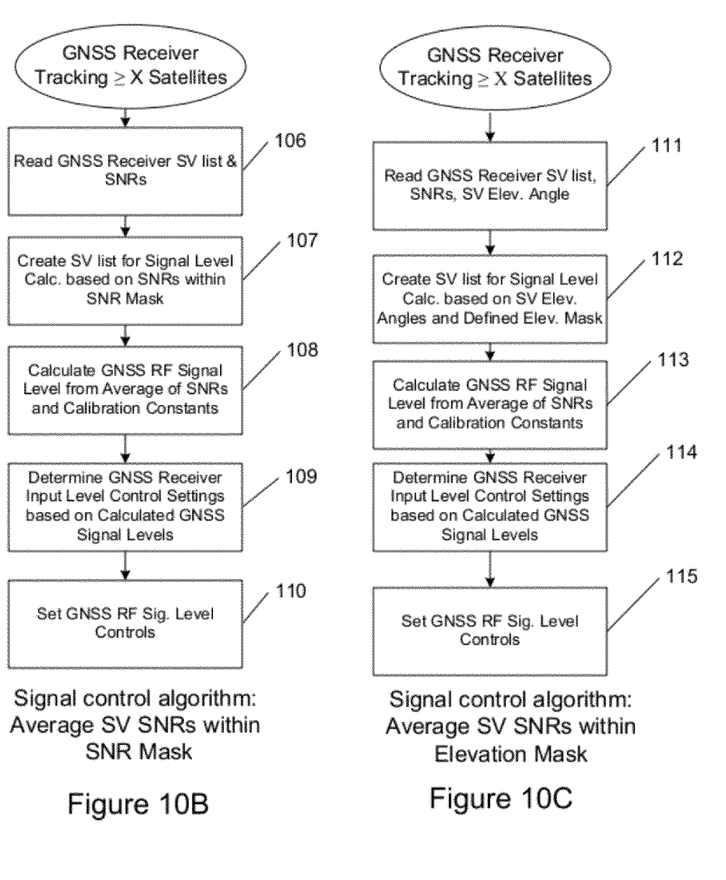
FIG. 10B illustrates an illustrative example for an algorithm for calculating and controlling the GNSS radio frequency signal levels within the GNSS signal distribution network based on the Satellite Vehicle Signal-To-Noise Ratios (SNRs) that fall within an specified SNR level mask in accordance with one or more aspects of the present invention.
FIG. 10C illustrates an illustrative example for an algorithm for calculating and controlling the GNSS radio frequency signal levels within the GNSS signal distribution network based on the Signal-To-Noise Ratios (SNRs) of the Satellite Vehicles that fall within an specified SV elevation mask in accordance with one or more aspects of the present invention.

With reference to FIGS. 10A, 10B, and 10C, a description of the possible algorithms for how the GNSS signal levels within the distribution network may be determined are presented. FIG. 10A may relate to the GNSS receiver tracking X or more satellites (step 101). Here, FIG. 10A shows a process for averaging all available satellite vehicle SNRs. In FIG. 10A, the list of satellite vehicles and signal to noise rations (SNRs) from the GNSS receiver are read in step 101. In step 102, the power monitor and control processor 34A may calculate the average GNSS RF signal level from an average of the SNRs and calibration constants. Next, in step 103, the GNSS RF signal level control setting is determined based on the average GNSS RF signal level from step 102. In step 104, the GNSS RF signal level control 39 is set based on the GNSS RF signal level determined in step 103.

Figure 12:
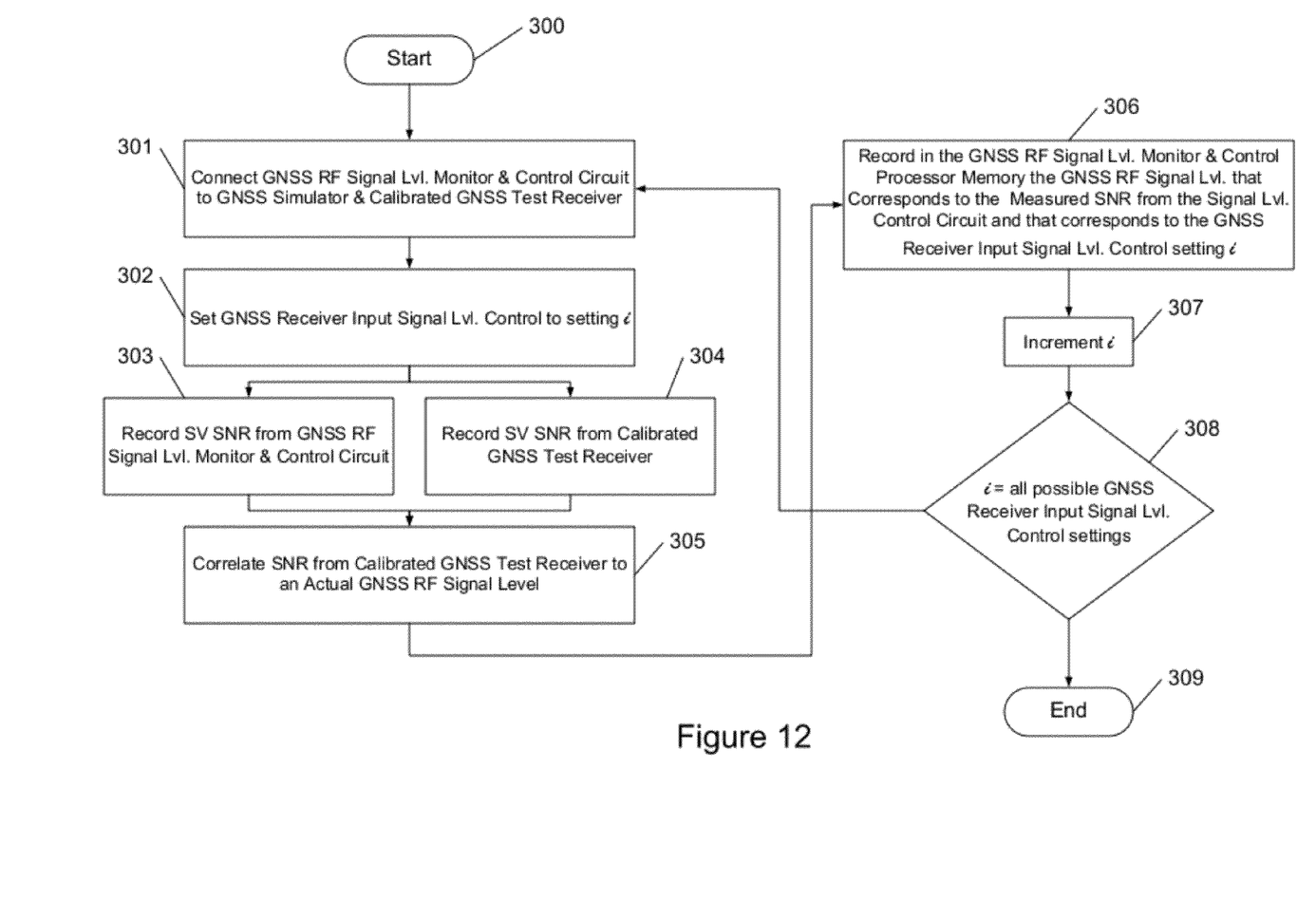
FIG. 12 illustrates an illustrative example of an algorithm for the calibration of the GNSS radio frequency signal level monitor and control circuit in accordance with one or more aspects of the present invention.

An illustrative process for determining the calibration constants is described with reference to FIG. 12 below. The calibration constants may include at least one of 1) a linear relationship between the reported signal-to-noise ratios and the GNSS radio frequency signal level, 2) the calibrated/measured loss through the circuit for sampling the radio frequency signal levels, and 3) the calibrated/measured gain or loss through the GNSS receiver input level control device 39.

Referring back to FIG. 10A, FIG. 10A shows a process for determining the signal levels within the GNSS signal distribution network by calculating an average of all the satellite vehicle signal-to-noise ratios reported from the GNSS receiver. The Average SNR is then used to determine the actual signal level within the network. The average signal level in the network may be based on the calibration constants that may or may not include taking into account the attenuation or gain of a signal level through sampling of the RF signals and through the device for controlling the input levels to the GNSS receiver.

For example, the signal level available within the distribution network might be calculated as follows:

$$P_{GNSS} = SNR_{AVG} + Y_{INT} + G_{SMPL} + G_{RX\_ATTEN}$$

Where:
$P_{GNSS}$=GNSS signal level available in the signal distribution network (decibles)
$SNR_{AVG}$=Average of all signal-to-noise ratios reported by the GNSS receiver (decibles)
$Y_{INT}$=Y axis intercept point of the function that calculates GNSS power levels based on SNRs reported from the GNSS receiver, where:
$P_{GNSS}(SNR) = m*(SNR) + Y_{INT}$; m equaling a slope of unity, or 1
$G_{SMPL}$=Gain (or loss) of the circuit for sampling the radio frequency signal levels
$G_{RX\_ATTEN}$=Gain (or loss) of the GNSS receiver input level control device Another possible example of this algorithm may include the conversion of the SNR's to actual GNSS signal levels prior to averaging and subsequently adding the gains for the circuit for sampling the radio frequency signal levels and the GNSS receiver input level control device.

FIG. 10B shows a process for controlling the signal level for GNSS receiver 132 by averaging the satellite list SNRs with a SNR mask where the GNSS receiver 132 is tracking X or more satellites. In step 106, the power monitor and control processor 34A reads the GNSS receiver 132's satellite list and associated signal-to-noise ratios. Next, in step 107, the power monitor and control processor 34A filters the satellite list from step 106 to include only those SNRs within an SNR mask (e.g., comporting with one or more thresholds). Next, in step 108, the power monitor and control processor 34A calculates the GNSS RF signal level from the average of the SNRs in the satellite vehicle list and calibration constants. Next in step 109, the GNSS receiver 132's input signal level control level 33A is determined. Finally, in step 110, power monitor and control processor 34A sets the GNSS RF signal level control or controls 33A.

In other words, with reference to FIG. 10B, the power monitor and control processor 34A may determine the signal levels within the GNSS signal distribution network by calculating an average of all the satellite vehicle signal-to-noise ratios reported from the GNSS receiver that fall within a specified SNR mask. For example, the GNSS signal level may be calculated using only satellite vehicle SNRs that exceed a minimum threshold. Alternatively, the SNRs used may be limited to those below a maximum threshold. Further, the SNRs used may be limited to those above a minimum threshold and below a maximum threshold. Once the list of satellite vehicle SNRs that meet the criteria are determined, the GNSS signal level within the network may be calculated in a manner similar to the algorithm described in the preceding example.

Alternatively, another possible example of this algorithm may include the conversion of the SNR's to actual GNSS signal levels prior to averaging and subsequently adding the gains for the circuit for sampling the radio frequency signal levels and the GNSS receiver input level control device.

FIG. 10C relates to the GNSS receiver 132 tracking X or more satellites. FIG. 10C shows a process that averages the satellite vehicle's SNRs within an elevation mask. In step 111, the power monitor and control processor 34A reads the GNSS receiver 132's satellite vehicle list, their SNRs, and the satellite vehicles' elevation angle. Next, in step 112, the power monitor and control processor 34A creates a satellite vehicle list of signal level calculations based on the satellite vehicles' elevation angles and the defined elevation mask. In step 113, the power monitor and control processor 34A calculates the GNSS RF signal level from the average of the SNRs in the satellite vehicle list and calibration constants. Next, in step 114, the GNSS receiver 132's input signal level control level 33A is determined. Finally, in step 115, the power monitor and control processor 34A sets the GNSS RF signal level control or controls 33A.

In other words, with reference to FIG. 10C, the power monitor and control processor 34A may determine the signal levels within the GNSS signal distribution network by calculating an average of all the satellite vehicle signal-to-noise ratios reported from the GNSS receiver that fall within a specified satellite elevation mask. For example, the GNSS signal level may be calculated using only SNRs from satellite vehicles that are within a specified elevation angle in the sky relative to the horizon and relative to the location of the GNSS network's receive antenna. For example, a specified satellite elevation mask may include all satellite vehicles that are greater than 25 degrees elevation above the horizon but below 85 degrees above the horizon. Once the list of satellite vehicle SNRs that meet the criteria are determined, the GNSS signal level within the network may be calculated in a manner similar to the algorithm described in the preceding examples.

Figure 11:
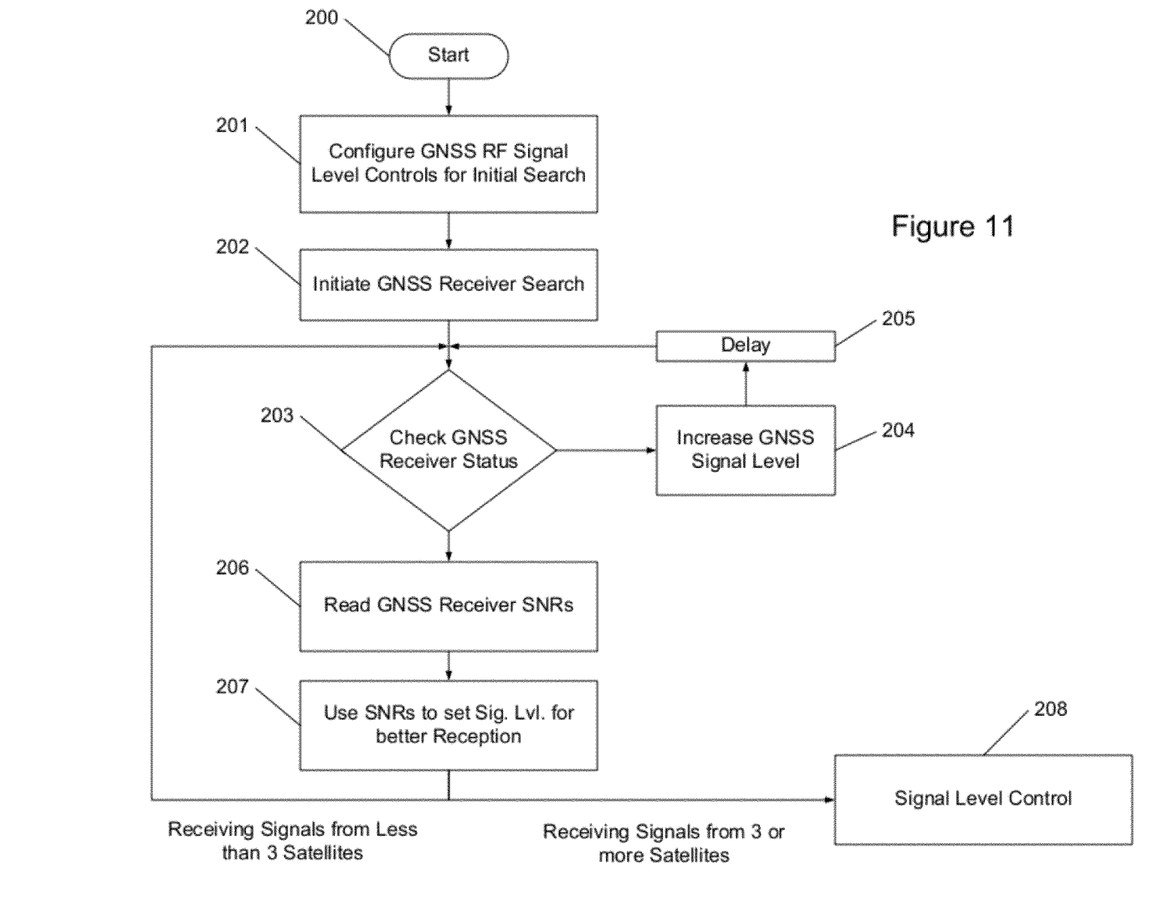
FIG. 11 illustrates an illustrative example of an algorithm for the GNSS radio frequency signal level monitor and control circuit to monitor and control the GNSS radio frequency signal level in accordance with one or more aspects of the present invention.

With reference to FIG. 11, an illustrative example will now be described for initialization and operation of the system for monitoring and controlling the GNSS radio frequency signal levels within a GNSS signal distribution network. In this example, the power monitor and control processor initializes the system by setting the GNSS signal level controls for low signal levels within the GNSS signal distribution network and to the GNSS receiver in step 201. Once signal level controls are set, the GNSS receiver is enabled and the search for GNSS satellite vehicle signals within the GNSS signal distribution system may begin in step 202. On a periodic or continuous basis, the power monitor and control processor evaluates the GNSS receiver status to determine in step 203 if the receiver is still searching for GNSS satellite vehicle signals, or if the GNSS receiver has began to track a set of the potentially available GNSS satellite vehicle signals. If the GNSS receiver has yet to discover GNSS satellite vehicle signals, the power monitor and control processor increases in step 204 the GNSS signal levels within the distribution network by setting the GNSS signal level controls and then re-check the GNSS receiver status after a short delay (205—added or inherent in the system).

If the GNSS receiver has discovered GNSS satellite vehicle signals within the GNSS distribution network, the GNSS receiver begins, to report signal-to-noise values that correspond to the signal levels of satellite vehicle signals that have been discovered. Here, power monitor and control processor 34A may read the GNSS receiver 132's SNRs for the satellite vehicles in step 206 and use the SNRs to set the signal level or levels for better reception in step 207. Here, the power monitor and control processor adjusts the GNSS signal levels within the distribution network by setting the GNSS signal level controls as needed to achieve the specified signal level in the network and to provide GNSS signal levels to the power monitor and control GNSS receiver that are within the dynamic range of the GNSS receiver 132. At the newly established GNSS signal level control settings, the GNSS receiver will begin to discover additional satellite vehicle signals until most or all available signals are discovered. Once three or more, GNSS satellite vehicle radio frequency signals have been discovered, the GNSS receiver 132 then begins to generate position fixes in step 208. At this point, the power monitor and control processor may consider the SNR reports from the GNSS receiver to be valid and the algorithms described earlier may be initiated for calculating, monitoring, and controlling the GNSS signal levels within the GNSS signal distribution network as described with respect to FIGS. 10A-10C.

The power monitor and control processor may use an assumed loss or gain for the sampling of the radio frequency signals and/or the GNSS receiver input level control device. Alternatively, and as described above, the power monitor and control processor may require a knowledge of the gain (or loss) of the circuit for sampling the radio frequency signal levels and the gain (or loss) of the GNSS receiver input level control device in order to accurately calculate the signal levels within the GNSS signal distribution network. With reference to FIG. 12, an illustrative example will now be described for calibration of gain (or loss) of the circuit for sampling the radio frequency signal levels and the gain (or loss) of the GNSS receiver input level control device 300. The GNSS signal level monitor and control system may be calibrated by connecting a GNSS simulator to the input of the system and a calibrated instrumentation GNSS test receiver to the output in step 301. With the GNSS receiver input level control device set to the first of a number of "i" possible settings in step 302, the SNR values of the GNSS signal level monitor and control receiver and the calibrated instrumentation GNSS test receiver are recorded, 303 and 304, respectively. As described in a previous example, the GNSS signal level within the GNSS signal distribution network can be determined by the following equation:

$$P_{GNSS} = SNR_{AVG} + Y_{INT} + G_{SMPL} + G_{RX\_ATTEN}$$

Wherein the expression $Y_{INT} + G_{SMPL} + G_{RX\_ATTEN}$ may be represented as a single unknown constant calibration factor K, resulting in $$P_{GNSS} = SNR_{AVG} + K$$

Since the SNR from the calibrated instrumentation GNSS test receiver that is connected to the output can be directly correlated to the output power, $P_{GNSS}$, and since the value $SNR_{AVG}$ may be read directly from the GNSS signal level monitor and control receiver in step 305, the unknown calibration factor K may be determined. The system may then in step 306 record in the memory of the GNSS RF signal level monitor and control processor 34A the calibration factor K that corresponds to the signal level control circuit and the sampling device. The calibration factor K is then used to determine the GNSS RF signal level that corresponds to the measured SNR from the GNSS receiver passing through the GNSS receiver input signal level control circuit.

Since there are a number of "i" possible settings of the GNSS receiver input level control device, the calibration process described herein may be repeated for all "i" possible settings, creating and recording in the power monitor and control processor memory each calibration factor $K_i$, for all "i" possible settings. For instance, this may be done by incrementing i in step 307 and performing in step 308 an analysis of i for all possible GNS receiver input signal level control settings. Once completed, the system may then end in step 309.

These and other aspects of the invention can be used to monitor and control GNSS signal levels within a GNSS signal distribution network. Aspects of the present invention have been described in terms of preferred and illustrative examples. Numerous other embodiments, modifications and variations within the scope and spirit of the appended claims will occur to persons of ordinary skill in the art from a review of this disclosure.

What is claimed is:

1. A method comprising:
    receiving, at a device coupled to a first GNSS receiver, a first GNSS signal;
    generating a second GNSS signal related to said first GNSS signal, wherein said second GNSS signal is receivable by at least a second GNSS receiver;
    obtaining a figure of merit based on said second GNSS signal;
    outputting said second GNSS signal via a signal distribution network; and
    modifying a signal level at which said second GNSS signal is output based on said figure of merit.

2. The method according to claim 1, wherein said figure of merit is based on a signal-to-noise ratio.

3. The method according to claim 1, wherein said figure of merit is based on a power level.

4. The method according to claim 1, further comprising:
    obtaining a list of satellite vehicles; and
    obtaining other figures of merit based on other GNSS signals generated from other received signals, wherein said first GNSS signal and each of said other received GNSS signals correspond to said satellite vehicles; and modifying a signal level at which each of said other generated GNSS signals is output based on said other figures of merit.

5. The method according to claim 4, further comprising:
averaging all of said figures of merit to obtain an average figure of merit;
determining an average power level in said signal distribution network based on at least said average figure of merit, and
generating a control signal based on said average power level.

6. The method according to claim 5, wherein said determining said average power level is further based on at least one calibration constant.

7. The method according to claim 4, wherein said list of satellite vehicles includes all satellite vehicles tracked by the first GNSS receiver.

8. The method according to claim 4, wherein said list of satellite vehicles only includes satellites whose related figures of merit comports with at least one threshold.

9. The method according to claim 4, wherein said list of satellite vehicles only includes satellites whose elevation angle comports with at least one threshold.

10. A GNSS signal distribution system comprising:
a network configured to receive one or more first GNSS signals, said network configured to generate one or more second GNSS signals related to said one or more first GNSS signals, wherein said one or more second GNSS signals are receivable by a GNSS receiver, said network configured to distribute said one or more second GNSS signals to said GNSS receiver; and
a circuit configured to obtain one or more figures of merit based on said one or more second GNSS signals in said network, and configured to modify a signal level at which said one or more second GNSS signals is distributed based on said one or more figures of merit.

11. The GNSS signal distribution system, according to claim 10, further comprising:
one or more amplification stages.

12. The GNSS signal distribution system, according to claim 10, further comprising:
one or more signal divider networks.

13. The GNSS signal distribution system, according to claim 10, said distribution network further including coaxial cables.

14. The GNSS signal distribution system according to claim 10, said distribution network further including fiber optic transmission lines.

15. The GNSS signal distribution system according to claim 10, said distribution network further including:
a wireless transmitter; and
a wireless receiver,
said network configured to distribute said one or more second GNSS signals by transmitting, at a shifted frequency, one or more second GNSS signals from said wireless transmitter to said wireless receiver.

16. The GNSS signal distribution system according to claim 10, said distribution network further comprising:
a GNSS re-radiator configured to radiate said one or more second GNSS signals.

17. The method according to claim 1, wherein said obtaining comprises determining said figure of merit based on measuring a signal level of said second GNSS signal.

18. The method according to claim 1, said obtaining comprises receiving said figure of merit from the first GNSS receiver.

19. The method according to claim 4, further comprising:
generating a control signal based on all of said figured of merit, wherein modifying the signal level at which said second GNSS signal is output is performed based on said control signal.

20. The GNSS signal distribution network according to claim 10, said network further configured to generate a control signal based on said one or more figures of merit, and to modify said signal level at which said one or more second GNSS signals is distributed based on said control signal.

21. The method according to claim 3, wherein said figure of merit is based on a signal power level.

22. The method according to claim 3, wherein said figure of merit is based on a noise power level.

23. The GNSS signal distribution system according to claim 10, wherein said figure of merit is based on a signal-to-noise ratio (SNR).

24. The GNSS signal distribution system according to claim 10, wherein said figure of merit is based on a signal power level.

25. The GNSS signal distribution system according to claim 10, wherein said figure of merit is based on a noise power level.

26. A method comprising:
receiving a GNSS signal;
obtaining said GNSS signal by a sampling circuit;
decoding said GNSS signal by a GNSS receiver, and outputting a figure of merit;
modifying said GNSS signal based on said figure of merit; and
outputting said modified GNSS signal for transmission on a distribution network.

* * * * *